US006743885B2

(12) United States Patent
Yahagi et al.

(10) Patent No.: US 6,743,885 B2
(45) Date of Patent: Jun. 1, 2004

(54) RESIN COMPOSITION FOR INTERMEDIATE LAYER OF THREE-LAYER RESIST

(75) Inventors: Isao Yahagi, Tsuchiura (JP); Yasunori Uetani, Toyonaka (JP); Hiroshi Moriuma, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/198,120

(22) Filed: Jul. 19, 2002

(65) Prior Publication Data

US 2003/0092854 A1 May 15, 2003

(30) Foreign Application Priority Data

| Jul. 31, 2001 | (JP) | ........................... 2001-231223 |
| Aug. 28, 2001 | (JP) | ........................... 2001-257446 |
| Sep. 27, 2001 | (JP) | ........................... 2001-296472 |

(51) Int. Cl.⁷ ............................................... C08G 77/14
(52) U.S. Cl. .............................. 528/40; 528/12; 528/21; 528/33; 528/43; 525/477
(58) Field of Search ......................... 525/477; 528/12, 528/21, 33, 40, 43

(56) References Cited

U.S. PATENT DOCUMENTS

| 5,422,223 | A | * | 6/1995 | Sachdev et al. ............. 430/190 |
| 5,691,396 | A | * | 11/1997 | Takemura et al. ............. 522/62 |
| 5,723,257 | A | * | 3/1998 | Iwasa ....................... 430/270.1 |
| 5,882,844 | A | * | 3/1999 | Tsuchiya et al. .......... 430/288.1 |
| 6,087,064 | A | * | 7/2000 | Lin et al. ................. 430/270.1 |
| 6,121,342 | A | * | 9/2000 | Suzuki et al. ................ 522/148 |
| 2002/0012871 | A1 | * | 1/2002 | Hatakeyama et al. ..... 430/270.1 |
| 2002/0115017 | A1 | * | 8/2002 | Angelopoulos et al. ... 430/270.1 |
| 2002/0168164 | A1 | * | 11/2002 | Bishop et al. ............... 385/128 |

FOREIGN PATENT DOCUMENTS

| EP | 0 167 854 A1 | 1/1986 |
| JP | 60-254034 A | 12/1985 |
| JP | 60-262150 A | 12/1985 |
| JP | 60-262151 A | 12/1985 |
| JP | 63-16623 A | 1/1988 |
| JP | 63-77050 A | 4/1988 |
| JP | 63-118739 A | 5/1988 |
| JP | 2-2567 A | 1/1990 |
| JP | 2-32356 A | 2/1990 |
| JP | 3-113450 A | 5/1991 |
| JP | 3-126036 A | 5/1991 |
| JP | 4-5658 A | 1/1992 |
| JP | 4-6563 A | 1/1992 |
| JP | 4-43264 A | 7/1992 |
| JP | 4-372114 A | 12/1992 |
| JP | 5-36599 A | 2/1993 |
| JP | 5-265224 A | 10/1993 |
| JP | 5-267158 A | 10/1993 |
| JP | 5-333559 A | 12/1993 |
| JP | 7-160003 A | 6/1995 |

* cited by examiner

Primary Examiner—Jeffrey B. Robertson
(74) Attorney, Agent, or Firm—Sughrue Mion, PLLC

(57) ABSTRACT

The object of the present invention is to provide resin composition for intermediate layer of a three-layer resist comprising (A) a polyorganosilsesquioxane resin having a weight-average molecular weight of from 1000 to 50000 and having two or more functional groups, which polymerize or condense at the presence of a acid, in the molecule, and (B) a compound generating an acid by electromagnetic wave or heat, and resin composition for intermediate layer of a three-layer resist, comprising (C) a polyorganosilsesquioxane resin having in the molecule a hydroxyl group and having a weight-average molecular weight of from 1000 to 50000, as resin composition for intermediate layer of a three-layer resist which, when ketone compounds, aromatic compounds and the like are used as a resist solvent, does not cause dissolution of an intermediate layer in applying an upper layer resist and does not cause formation of a mixing layer at the interface with the upper layer resist, and which shows little change by time, excellent in storage stability, and can form a hardened film without cracking.

12 Claims, No Drawings

RESIN COMPOSITION FOR INTERMEDIATE LAYER OF THREE-LAYER RESIST

FIELD OF THE INVENTION

The present invention relates to resin composition for intermediate layer of a three-layer resist.

BACKGROUND OF THE INVENTION

In pattern formation of a semiconductor substrate in production of LSI and bubble memory element and the like, a lithography method combining an organic resist and X-ray exposure is used. Recently, with progress of finer pattern dimension, improvement in pattern precision is required, consequently, a three-layer resist method has been developed.

The three-layer resist method is a method in which a resist for I-line made of a novolak resin or the like is applied on a substrate, this is thermally hardened to form a flattened layer insoluble in an organic solvent, an intermediate layer is applied on this, and thermally hardened, finally, an upper layer resist is applied, and the upper layer resist is exposed and developed to form a pattern which is sequentially transferred to lower layers by dry etching, to process the substrate.

As the intermediate layer of a three-layer resist, spin on glass (SOG), silicone resin and the like are conventionally used.

However, a film of SOG tends to be cracked in hardening, and application liquid thereof tends to change in properties with time, such as hardening and gelling.

When ketone compounds, aromatic compounds and the like are used as a resist solvent, an intermediate layer of silicone resin is dissolved in applying an upper layer resist, and a mixing layer is formed at the interface with the upper layer resist.

An object of the present invention is to provide resin composition for intermediate layer of a three-layer resist which, when ketone compounds, aromatic compounds and the like are used as a resist solvent, does not cause dissolution of an intermediate layer in applying an upper layer resist and does not cause formation of a mixing layer at the interface with the upper layer resist, and which shows little change in properties with time, excellent in storage stability, and can form a hardened film without cracking.

SUMMARY OF THE INVENTION

The present inventors have intensively studied to find resin composition causing no problems as describe above, and resultantly found that a resin composition comprising a polyorganosilsesquioxane resin having two or more functional groups, which polymerize or condense at the presence of an acid, in the molecule and having a weight-average molecular weight of from 1000 to 50000, and a compound generating an acid by electromagnetic wave or heat; when ketone compounds, aromatic compounds and the like are used as a resist solvent; does not cause dissolution of an intermediate layer in applying an upper layer resist and does not cause formation of a mixing layer at the interface with the upper layer resist, and shows little change in properties with time, excellent in storage stability, can form a hardened film without cracking, and suitable for intermediate layer of a three-layer resist.

Namely, the present invention provides resin composition for intermediate layer of a three-layer resist comprising (A) a polyorganosilsesquioxane resin having a weight-average molecular weight of from 1000 to 50000 and having two or more functional groups, which polymerize or condense at the presence of a acid, in the molecule, and (B) a compound generating an acid by electromagnetic wave or heat.

DETAILED DESCRIPTION OF THE INVENTION

The polyorganosilsesquioxane resin (A) used in the present invention is required to have a weight-average molecular weight of from 1000 to 50000, and it is preferably from 1000 to 20000.

When the weight-average molecular weight of the polyorganosilsesquioxane resin of the present invention is less than 1000, or when over 50000, film formation property is deteriorated.

Additionally, the polyorganosilsesquioxane has two or more functional groups, which polymerize or condense at the presence of an acid.

The functional groups may include oxetan or an alkoxysily groups of the general formulae (12) to (15) as shown later.

The polyorganosilsesquioxane resin (A) having oxetan group may be obtained by reacting two or more molecules of an organosilicon compound of the general formula (1).

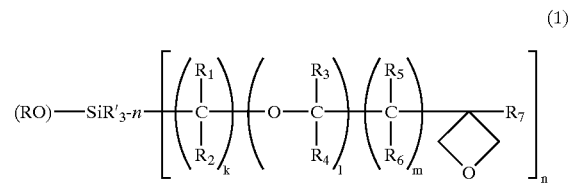

(1)

In the formula (1), R represents a methyl group or ethyl group.

R' represent a methoxy group, ethoxy group, or a mono-valent organic group having 1 to 20 carbon atoms, and when a plurality of $R_1$ are present, they may be the same or different.

$R_1$ to $R_7$ represent a hydrogen atom or a mono-valent organic group having 1 to 20 carbon atoms, and they may be the same or different.

k, l, m represent an integer of 0 or more, and n represents an integer of 1 to 3.

The mono-valent organic group having 1 to 20 carbon atoms may be any of linear, branched and cyclic, and for example, linear aliphatic hydrocarbon groups having 1 to 20 carbon atoms, branched aliphatic hydrocarbon groups having 3 to 20 carbon atoms, cyclic aliphatic hydrocarbon groups having 3 to 20 carbon atoms, aromatic hydrocarbon groups having 6 to 20 carbon atoms optionally substituted by an alkyl group, and the like are listed, and preferable are linear hydrocarbon groups having 1 to 6 carbon atoms, branched hydrocarbon groups having 3 to 6 carbon atoms, cyclic hydrocarbon groups having 3 to 6 carbon atoms, aromatic hydrocarbon groups having 6 to 20 carbon atoms optionally substituted by an alkyl group.

The alkyl group, for example, may include methyl group, ethyl group, propyl group, butyl group, pentyl group, hexyl group, isopropyl group, isobutyl group, tertiary butyl group, cyclopropyl group, cyclobutyl group, cyclopentyl group, cyclohexyl group and the like.

The aliphatic hydrocarbon group, for example, may include a methyl group, ethyl group, propyl group, butyl group, pentyl group, hexyl group, isopropyl group, isobutyl group, tertiary butyl group, cyclopropyl group, cyclobutyl group, cyclopentyl group, cyclohexyl group, chloromethyl group, dichloromethyl group, 2-chloroethyl group, 2,2-dichloroethyl group, 1,2-dichloroethyl group, 1,1-dichloroethyl group and the like.

The aromatic hydrocarbon group having 6 to 20 carbon atoms optionally substituted by an alkyl group, for example, may include a phenyl group, naphthyl group, anthryl group, tolyl group, xylyl group, dimethylphenyl group, trimethylphenyl group, ethylphenyl group, diethylphenyl group, triethylphenyl group, propylphenyl group, butylphenyl group, methylnaphthyl group, dimethylnaphthyl group, trimethylnaphthyl group, vinylnaphthyl group, ethenylnaphthyl group, methylanthryl group, ethylanthryl group and the like.

The polyorganosilsesquioxane resin (A) having oxetane group may be obtained by reacting two or more molecules of an organosilicon compound of the general formula (1), and this reaction is preferably a hydrolysis reaction carried out in the presence of an acid catalyst or alkali catalyst.

As the acid catalyst, for example, hydrochloric acid, acetic acid and the like are listed, and as the alkali catalyst, for example, ammonia, triethylamine and the like are listed.

The polyorganosilsesquioxane resin (A) having oxetane group may also be obtained by reacting two or more molecules of an oxetanylalkoxysilane of the general formula (1) and at least one molecule of organoalkoxysilene of the general formulae (2) to (5).

 (2)

 (3)

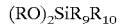 (4)

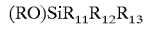 (5)

In the formulae, R represents a methyl group or ethyl group.

$R_8$ to $R_{13}$ represent a mono-valent organic group having 1 to 20 carbon atoms, and may be the same or different.

As the mono-valent organic group having 1 to 20 carbon atoms, the same organic groups as described above are listed.

The reaction of two or more molecules of an oxetanylalkoxysilane of the general formula (1) and at least one molecule of organoalkoxysilanes of the general formulae (2) to (5) is also preferably a hydrolysis reaction carried out in the presence of an acid catalyst or alkali catalyst.

The polyorganosilsesquioxane resin (A) having oxetane group may also be obtained by reacting at least one molecule of polyorganosilsesquioxane resins obtained by hydrolyzing at least one of organoalkoxysilanes of the general formulae (6) to (9) and two or more molecules of an oxetanylhalogenosilane of the general formula (10).

 (6)

 (7)

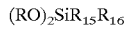 (8)

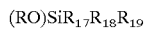 (9)

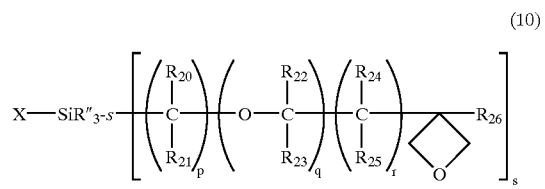

(10)

In the formula, X represents a halogen atom such as a fluorine atom, chlorine atom, bromine atom, iodine atom.

R represents a methyl group or ethyl group.

R" and $R_{14}$ to $R_{19}$ represent a mono-valent organic group having 1 to 20 carbon atoms, and may be the same or different.

p, q, r represent an integer of 0 to 20, and may be the same or different. s represents an integer of 1 to 3.

As the mono-valent organic group having 1 to 20 carbon atoms, the same groups as described above are listed.

The polyorganosilsesquioxane resin (A) may be encapsulated at a terminal group by an organosilicon compound of the general formula (11).

(11)

In the formula, X represents a halogen atom such as a fluorine atom, chlorine atom, bromine atom, iodine atom.

$R_{27}$ to $R_{29}$ represent a mono-valent organic group having 1 to 20 carbon atoms, and may be the same or different.

As the mono-valent organic group having 1 to 20 carbon atoms, the same groups as described above are listed.

Examples of the organosilicon compound of the general formula (11), for example, may include trimethylchlorosilane, chloromethyldimethylchlorosilane, triethylchlorosilane, dichloromethyldimethylchlorosilane, dimethylphenylchlorosilane and the like.

Further, the functional groups may include at least one of the alkoxysilyl gourps of the general formulae (12) to (15) and the polyorganosilsesquioxane resin (A) may have at least one of the alkoxysily groups of the general formulae (12) to (15) as a functional group in which may polymerize or condense at the presence of an acid.

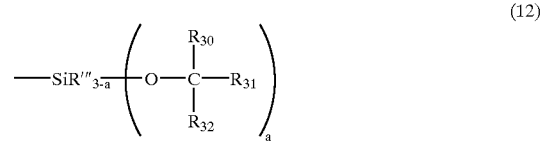

(12)

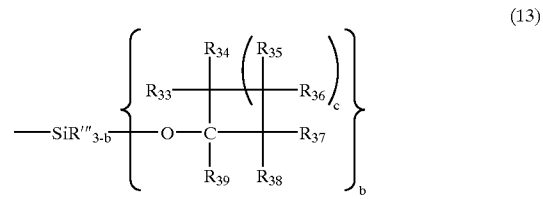

(13)

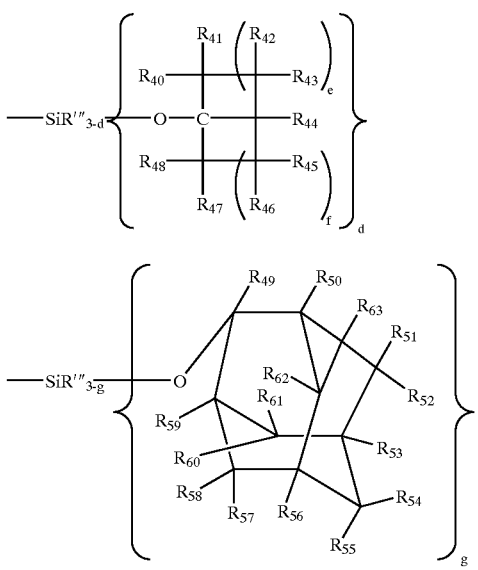
(14)

(15)

In the formula, R''' represents a mono-valent organic group having 1 to 20 carbon atoms, and may be the same or different.

$R_{30}$ to $R_{63}$ represent a hydrogen atom or a mono-valent organic group having 1 to 20 carbon atoms, and maybe the same or different.

a, b, d, g represent an integer of 1 to 3, and may be the same or different. c represents an integer of 0 to 6. e, f represent an integer of 1 to 6, and may be the same or different.

As the mono-valent organic group having 1 to 20 carbon atoms, the same groups as described above are listed.

The above alkoxysily group, for example, may include dimethyl-tert-butoxysilyl group,
ethylmethyl-tert-butoxysilyl group,
diethyl-tert-butyoxysilyl group,
dimethyl(1-methyl-cyclopropyl-1-oxy)silyl group,
dimethyl(1-ethyl-cyclopropyl-1-oxy)silyl group,
dimethyl(1-methyl-cyclobutyl-1-oxy)silyl group,
dimethyl(1-ethyl-cyclobutyl-1-oxy)silyl group,
dimethyl(1-methyl-cyclopentyl-1-oxy)silyl group,
dimethyl(1-methyl-cyclohexyl-1-oxy)silyl group,
dimethyl(bicyclo[2,2,0]hexyl-1-oxy)silyl group,
dimethyl(bicyclo[3,3,0]octyl-1-oxy)silyl group,
dimethyl(bicyclo[4,4,0]decyl-1-oxy)silyl group,
dimethyl(2-methyl-adamantyl-2-oxy)silyl group,
dimethyl(2-ethyl-adamantyl-2-oxy)silyl and the like.

The polyorganosilsesquioxane resin (A), for example, may include

3-[(3'-ethyl-3'-oxetanyl)methyloxy]propylsilsesquioxane,
3-[(3'-oxetanyl)methyloxy]propylsilsesquioxane,
3-[(3'-methyl-3'-oxetanyl)methyloxy]propylsilsesquioxane,
3-[(3'-propyl-3'-oxetanyl)methyloxy]propylsilsesquioxane,
3-[(3'-butyl-3'-oxetanyl)methyloxy]propylsilsesquioxane,
3-[(2'-(3"-ethyl-3"-oxetanyl)ethyloxy]propylsilsesquioxane,
3-[(2'-(3"-ethyl-3"-oxetanyl)ethyloxy]propylsilsesquioxane,
3-[3'-ethyl-(3"-ethyl-3"-oxetanyl)propyloxy]propylsilsesquioxane,
2-[(3'-ethyl-3'-oxetanyl)methyloxy]ethylsilsesquioxane,
2-[(3'-oxetanyl)methyloxy]ethylsilsesquioxane,
2-[(3'-methyl-3'-oxetanyl)methyloxy]ethylsilsesquioxane,
2-[(3'-propyl-3'-oxetanyl)methyloxy]ethylsilsesquioxane,
2-[(3'-butyl-3'-oxetanyl)methyloxy]ethylsilsesquioxane,
2-[(2'-(3"-ethyl-3"-oxetanyl)ethyloxy]ethylsilsesquioxane,
2-[(1'-(3"-ethyl-3"-oxetanyl)ethyloxy]ethylsilsesquioxane,
2-[(3'-(3"-ethyl-3"-oxetanyl)propyloxy)ethylsilsesquioxane,
dimethyl-tert-butoxysilyl silsesquioxane,
ethylmethyl-tert-butoxysilyl silsesquioxane,
diethyl-tert-butyoxysilyl silsesquioxane,
dimethyl(1-methyl-cyclopropyl-1-oxy)silyl silsesquioxane,
dimethyl(1-ethyl-cyclopropyl-1-oxy)silyl silsesquioxane,
dimethyl(1-methyl-cyclobutyl-1-oxy)silyl silsesquioxane,
dimethyl(1-ethyl-cyclobutyl-1-oxy)silyl silsesquioxane,
dimethyl(1-methyl-cyclopentyl-1-oxy)silyl silsesquioxane,
dimethyl(1-methyl-cyclohexyl-1-oxy)silyl silsesquioxane,
dimethyl(bicyclo[2,2,0]hexyl-1-oxy)silyl silsesquioxane,
dimethyl(bicyclo[3,3,0]octyl-1-oxy)silyl silsesquioxane,
dimethyl(bicyclo[4,4,0]decyl-1-oxy)silyl silsesquioxane,
dimethyl(2-methyl-adamantyl-2-oxy)silyl silsesquioxane,
dimethyl(2-ethyl-adamantyl-2-oxy)silyl silsesquioxane, and the like.

The polyorganosilsesquioxane resin (A) having at least one of the alkoxysily groups of the general formulae (12) to (15) as a functional group may obtained by reacting at least one molecule of polyorganosilsesquinoxane resin obtained by hydrolyzing at least one of organoalkoxysilanes of the above general formula (6) to (9) and two or more molecules of at least one of organohalogensilane of the general formula (12') to (15').

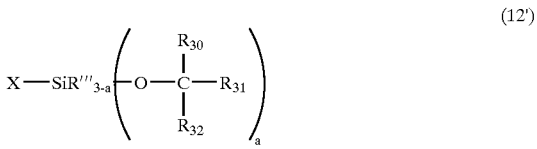
(12')

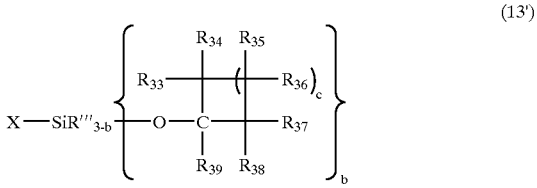
(13')

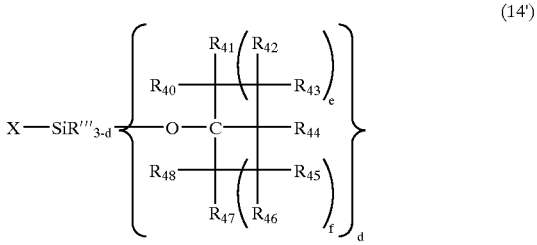
(14')

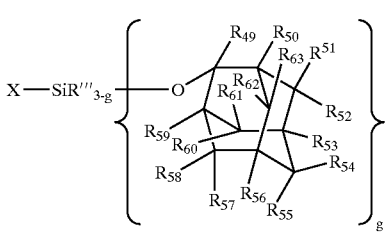
(15')

In the above formulae, X represents a halogen atom such as a fluorine atom, chlorine atom, bromine atom, and iodine atom. R''', $R_{30}$ to $R_{60}$, a, b, d and g are the same as described above.

As the compound generating an acid by electromagnetic wave or heat (B), for example, photo acid generators, photo cationic polymerization initiators, heat cationic polymerization initiators and the like are listed.

The photo acid generator, for example, may include [cyclohexyl-(2-cyclohexanonyl)-methyl]sulfonium trifluoromethanesulfonate, bis(p-tolylsulfonyl) diazomethane, bis(cyclohexylsulfonyl)diazomethane, tertiary butyl carbonylmethyl-tetrahydrothiophenium trifluoromethanesulfonate and the like. As the photo acid generator, compounds described in JP-A No. 11-202495 and the like may also be used, in addition to the above-mentioned compounds.

The photo cationic polymerization initiator, heat cationic polymerization initiator, for example, may include iodonium salts, sulfonium salts, phosphate salts, antimonate salts and the like are listed. Rhodorsil photoinitiator 2074, Adeka optomer-SP-150, Adeka optomer-SP-152, Adeka optomer-SP-170, Adeka optomer-SP-172, Adeka opton CP series and the like are listed. Further, compounds described in JP-A No. 9-118663 may also be used, in addition to the above-mentioned compounds.

The addition amount of the compound generating an acid by electromagnetic wave or heat (B) such as the photo acid generator, photo cationic polymerization initiator and heat cationic polymerization initiator is not particularly restricted, and preferably from 0.1% by weight to 20% by weight, more preferably from 0.5% by weight to 10% by weight, based on the polyorganosilsesquioxane resin. When less than 0.1% by weight, a tendency of no hardening may be observed, and when over 20% by weight, there may be a tendency of no recognition of an effect corresponding to the addition amount.

The resin composition of the present invention may contain (C) a polyorganosilsesquioxane resin having a hydroxyl group in the molecule and having a weight-average molecular weight of from 1000 to 50000, in addition to the polyorganosilsesquioxane resin (A) and the compound generating an acid by electromagnetic wave or heat (B).

The polyorganosilsesquioxane resin having a hydroxyl group in the molecule (C) may be obtained by condensing an organoalkoxysilane by an acid catalyst or alkali catalyst in the presence of water, then, encapsulating a terminal silanol group with a chlorosilane compound having a protected hydroxyl group, and then de-protecting the hydroxyl group.

The polyorganosilsesquioxane resin having a hydroxyl group in the molecule (C) may also be obtained by condensing an organoalkoxysilane having a protected hydroxyl group by an acid catalyst or alkali catalyst in the presence of water, then, de-protecting the hydroxyl group.

The polyorganosilsesquioxane resin (C) has a weight-average molecular weight of preferably from 1000 to 50000, more preferably from 1000 to 20000. When the weight-average molecular weight of the polyorganosilsesquioxane resin (C) is less than 1000, or over 50000, film forming property may be deteriorated.

The organoalkoxysilane, for example, organoethoxysilane, organomethoxysilane and the like are listed. Specific examples thereof include tetraethoxysilane, tetramethoxysilane, methyltriethoxysilane, methyltrimethoxysilane, dimethyldiethoxysilane, dimethyldimethoxysilane, trimethylethoxysilane, trimethylmethoxysilane, ethyltriethoxysilane, ethyltrimethoxysilane, diethyldiethoxysilane, diethyldimethoxysilane, triethylethoxysilane, triethylmethoxysilane, phenyltriethoxysilane, phenyltrimethoxysilane, diphenyldiethoxysilane, diphenyldimethoxysilane, tripheylethoxysilane, triphenylmethoxysilane, methylphenyldiethoxysilane, methylphenyldimethoxysilane, dimethylphenylethoxysilane, dimethylphenylmethoxysilane and the like.

As the acid catalyst, alkali catalyst, the same compounds as described above are listed.

A chlorosilane having a protected hydroxyl group may be easily produced by hydrosilylating a compound having a protected hydroxyl group and an unsaturated bond such as a vinyl group, allyl group and the like, and a dialkylchlorohydrosilane compound, in the presence of a transition metal catalyst.

A chlorosilane having a protected hydroxyl group may also be easily produced by a condensation reaction of an organometal compound having a protected hydroxyl group and a dialkyldichlorosilane compound.

As the protective group for a hydroxyl group, for example, alkyl groups, silyl group, ester groups and the like are listed. Specific examples thereof, in the case of the alkyl group, include a methoxymethyl group, benzyloxymethyl group, t-butoxymethyl group, 2-methoxyethoxymethyl group, 2,2,2-trichloroethoxymethyl group, 2-(trimethylsilyl) ethoxymethyl group, tetrahydropyranyl group, 3-bromotetrahydropyranyl group, tetrahydrothiopyranyl group, 4-methoxytetrahydropyranyl group, tetrahydrofuranyl group, 1-ethoxyethyl group, 1-methyl-1-methoxyethyl group, 1-(isopropoxy)ethyl group, 2,2,2-trichloroethyl group, 2-(phenylselenyl)ethyl group, t-butyl group, benzyl group, 3-methyl-2-picolyl N-oxide group, diphenylmethyl group, 5-dibenzosuberyl group, triphenylmethyl group, 9-anthryl group, trimethylsilyl group, triethylsilyl group, isopropyldimethylsilyl group, t-butyldimethylsilyl group, (triphenylmethyl)dimethylsilyl group, t-butyldiphenylsilyl group, methyldiisopropylsilyl group, methyldi-t-butylsilyl group, tribenzylsilyl group, triisopropylsilyl group, triphenylsilyl group, formyl group, acetyl group, 3-phenylpropionate group, 3-benzoylpropionate group, isobutyrate group, 4-oxopentanoate group, pivaloate group, adamantoate group, benzoate group, methoxycarbonyl group, ethoxycarbonyl group, 2,2,2-trichloroethoxycarbonyl group, iso-butyloxycarbonyl group, carbonate, benzyl carbonate and the like.

The hydroxyl group in the polyorganosilsesquioxane resin (C) is preferably a phenolic hydroxyl group or alcoholic hydroxyl group.

As the phenolic hydroxyl group, a phenolic hydroxyl group of the general formula (16) is preferable.

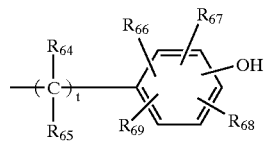

(16)

Wherein, $R_{64}$, $R_{65}$ represent a hydrogen atom or a mono-valent organic group having 1 to 20 carbon atoms. $R_{66}$ to $R_{69}$ represent a hydrogen atom, a hydroxy group or a mono-valent organic group having 1 to 20 carbon atoms. t represents an integer of 0 or more.

As the mono-valent organic group having 1 to 20 carbon atoms, the same compounds as described above are listed.

As the alcoholic hydroxyl group, an alcoholic hydroxyl group of the general formula (17) is preferable.

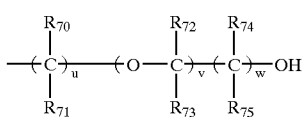

(17)

Wherein, $R_{70}$ to $R_{75}$ represent a hydrogen atom or amonovalent organic group having 1 to 20 carbon atoms. u, v represent an integer of 0 or more, and w represents an integer of 1 or more.

As the mono-valent organic group having 1 to 20 carbon atoms, the same compounds as described above are listed.

The polyorganosilsesquioxane resin having a hydroxyl group in the molecule (C), for example, may include 2-(4'-hydroxyphenyl)ethyldimethylsilylsilsesquioxane,
1-(4'-hydroxyphenyl)ethyldimethylsilylsilsesquioxane,
4-hydroxyphenylsilsesquioxane,
3-hydroxyphenylsilsesquioxane,
2-hydroxyphenylsilsesquioxane,
(4-hydroxyphenyl)methylsilsesquioxane,
2-(4'-hydroxyphenyl)ethylsilsesquioxane,
1-(4'-hydroxyphenyl)ethylsilsesquioxane,
3-(4'-hydroxyphenyl)propylsilsesquioxane,
(4-hydroxy-2-methylphenyl)silsesquioxane,
(4-hydroxy-3-methylphenyl)silsesquioxane,
(2,3-dimethyl-4-hydroxyphenyl)silsesquioxane,
2-(4'-hydroxyphenyl)ethyldiethylsilylsilsesquioxane,
1-(4'-hydroxyphenyl)ethyldiethylsilylsilsesquioxane,
hydroxymethylsilsesquioxane, hydroxyethylsilsesquioxane,
 hydroxypropylsilsesquioxane,
hydroxymethyloxyethylsilsesquioxane.

The resin composition for intermediate layer of a three-layer resist of one of another present inventions may also comprising (B) a compound generating an acid by electromagnetic wave or heat, and (C) a polyorganosilsesquioxane resin having a hydroxyl group in the molecule and having a weight-average molecular weight of 1000 to 50000, and at least one compound selected from the group consisting of compounds of the following formulae (18) and (19).

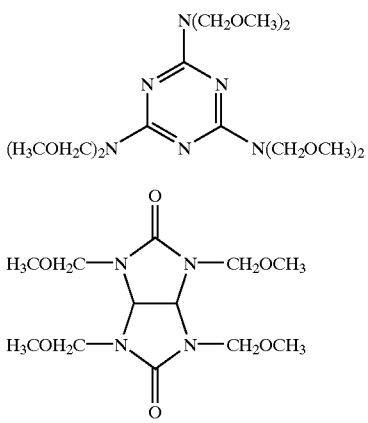

The resin composition for intermediate layer of a three-layer resist of one of another present inventions may also comprising (C) a polyorganosilsesquioxane resin having a hydroxyl group in the molecule and having a weight-average molecular weight of 1000 to 50000.

The intermediate layer of a three-layer resist may be produced by, for example, dissolving the resin composition of the present invention in an organic solvent such as 2-heptanone, propylene glycol monomethyl acetate and the like to prepare a solution in predetermined concentration, spin-coating the solution on a lower layer resist, and hardening the layer obtained by spin-coating.

The hardening temperature is preferably from 150 to 350° C., further preferably from 180 to 300° C.

The resin composition of the present invention can be used suitably in a three-layer resist intermediate layer since the composition is excellent in stability by time.

EXAMPLE

The present invention will be described based on examples below, but the scope of the present invention is not limited to these examples.

As the polyorganosilsesquioxane resins 1 and 2 used in the examples, resins obtained or produced as described below were used.

The effective sensitivity and resolution were measured as described below.

Effective sensitivity: represented by exposure amount at which line and space pattern of 0.18 µm shows 1:1.

Resolution: represented by the line width of line and space pattern resolved at the effective sensitivity Polyorganosilsesquioxane Resin 1

Oxetanylsilsesquioxane manufactured by Toagosei Co., Ltd. having a weight-average molecular weight of 10000.

Polyorganosilsesquioxane Resin 2

Into a 200 ml three-necked flask equipped with a three-way cock and rubber septum was placed a magnetic stirrer, 50 ml of ethanol, 4.7 g of pyridine and 6.2 g of trimethylchlorosilane, and the mixture was stirred at room temperature under a nitrogen atmosphere. To this was added 20 g of tetraethoxysilane and 20 g of oxetanyltriethoxysilane (manufactured by Toagosei Co., Ltd.) and 11.3 g of ammonia water having a pH of about 9 was dropped slowly using a gas tight syringe, and the mixture was further stirred for 18 hours at room temperature.

100 ml of methyl isobutyl ketone (MIBK) and 20 ml of water were added, and the mixture was further stirred for 2 hours. 200 ml of MIBK and 100 ml of water were added, the reaction mixture was carried to a separation funnel, and the aqueous layer was removed. The organic layer was carried to an eggplant flask, and the remaining water was distilled off by a rotary evaporator.

To the resulted reaction mixture was added 3.1 g of pyridine and 5.45 g of chloromethyldimethylchlorosilane, and they were reacted for 18 hours at room temperature.

After completion of the reaction, the reaction solution was washed with water using a separation funnel to remove the pyridine salt. After drying over anhydrous magnesium sulfate, the solvent was distilled off by a rotary evaporator, to obtain a crude silsesquioxane resin. The resulted crude silsesquioxane resin was washed four times with hexane, and re-dissolved in MIBK. The MIBK solution of the resulted silsesquioxane resin was passed through a silica gel column to remove the remaining pyridine.

The resulted MIBK solution of the silsesquioxane resin was concentrated by a rotary evaporator to obtain 8 g of the intended silsesquioxane resin.

The resulted silsesquioxane resin was stable even in concentrated condition, and did not cause gelling. As a result of GPC measurement, the weight-average molecular weight was 9700.

Examples 1 to 3

A composition obtained by adding a cross-linking agent to an I-line resist composed of a novolak resin was applied on a silicon substrate, and baked at 200° C. for 60 seconds to form a lower layer having a thickness of 0.50 μm for three-layer resist process. Next, 100 parts of the polyorganosilsesquioxane resin 1 and each 1 part of acid generators of the following general formulae (20), (21) and (22) were dissolved in 2-heptanone/γ-butyrolactone (95/5), further, filtrated through a membrane filter having a pore diameter of 0.2 μm to prepare an application solution. This application solution was applied on a lower layer, and baked at 200° C. for 60 seconds, to form an intermediate layer having a thickness of 0.033 μm. On this intermediate layer, ArF resist PAR-700 (manufactured by Sumitomo Chemical Co., Ltd.) was applied, and baked at 110° C. for 60 seconds, to form an upper layer resist having a thickness of 0.335 μm. Using an ArF excimer stepper "NSRArF" manufactured by Nikon Corp., NA=0.55, σ=0.60], line and space pattern was exposed while changing the exposure amount gradually. After exposure, post exposure bake was conducted at 115° C. for 60 seconds on a hot plate, further, paddle development was conducted for 60 seconds with a 2.38 wt % tetramethyl ammonium hydroxide aqueous solution.

Example 4

A composition obtained by adding a cross-linking agent to an I-line resist composed of a novolak resin was applied on a silicon substrate, and baked at 200° C. for 60 seconds to form a lower layer having a thickness of 0.50 μm for three-layer resist process. Next, 100 parts of the polyorganosilsesquioxane resin 2 and 1 part of an acid generator of the following general formula (21) were dissolved in 2-heptanone/γ-butyrolactone (95/5), further, filtrated through a membrane filter having a pore diameter of 0.2 μm to prepare an application solution. This application solution was applied on a lower layer, and baked at 200° C. for 60 seconds, to form an intermediate layer having a thickness of 0.110 μm. On this intermediate layer, ArF resist PAR-700 (manufactured by Sumitomo Chemical Co., Ltd.) was applied, and baked at 110° C. for 60 seconds, to form an upper layer resist having a thickness of 0.335 μm. Using an ArF excimer stepper ["NSR ArF" manufactured by Nikon Corp., NA=0.55, σ=0.60], line and space pattern was exposed while changing the exposure amount gradually. After exposure, post exposure bake was conducted at 115° C. for 60 seconds on a hot plate, further, paddle development was conducted for 60 seconds with a 2.38 wt % tetramethyl ammonium hydroxide aqueous solution.

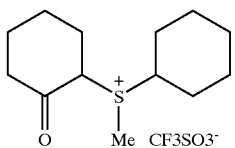

(20)

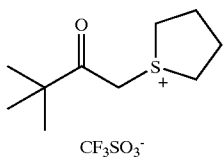

$CF_3SO_3^-$ (21)

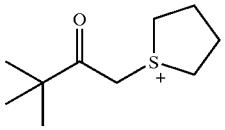

$C_4F_9SO_3^-$ (22)

TABLE 1

| Example No. | Resin | Acid generator | Effective sensitivity (mJ/cm$^2$) | Resolution (μm) |
|---|---|---|---|---|
| Example 1 | Resin 1 | (20) | 31 | 0.16 |
| Example 2 | Resin 1 | (21) | 25 | 0.16 |
| Example 3 | Resin 1 | (22) | 29 | 0.16 |
| Example 4 | Resin 2 | (21) | 27 | 0.15 |

According to the present invention, a resin composition suitable for application in a three-layer resist intermediate layer can be provided which, even when ketone compounds, aromatic compounds and the like are used as a resist solvent, does not cause dissolution of an intermediate layer in applying an upper layer resist and does not cause formation of a mixing layer at the interface with the upper layer resist, and which shows little change by time, excellent in storage stability, and can form a hardened film without cracking.

What is claimed is:

1. Resin composition for intermediate layer of a three-layer resist comprising (A) a polyorganosilsesquioxane having a weight-average molecular weight of from 1000 to 50000 and having two or more functional groups, which polymerize or condense at the presence of an acid in the molecule, and (B) a compound generating an acid by electromagnetic wave or heat, and wherein the polyorganosilsesquioxane resin (A) is obtained by reacting at least one molecule of polyorganosilsesquioxane resins obtained by hydrolyzing at least one of organosilicon compounds of the general formula (6) to (9) and two or more molecules of an organosilicon compound of the general formula (10):

$(RO)_4Si$ (6)

$(RO)_3SiR_{14}$ (7)

$(RO)_2SiR_{15}R_{16}$ (8)

$(RO)SiR_{17}R_{18}R_{19}$ (9)

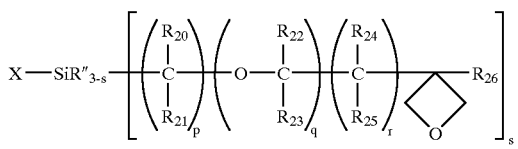

(10)

wherein, X represents a halogen atom, R represents a methyl group or ethyl group, R" and $R_{14}$ to $R_{26}$ each independently represents a mono-valent organic group having 1 to 20 carbon atoms, p, q, and r each independently represents an integer of 0 to 20, and s represents an integer of 1 to 3.

2. The resin composition according to claim 1 wherein the polyorganosilsesquioxane resin (A) has two or more oxetane groups in the molecule.

3. The resin composition according to claim 1, further comprising (C) a polyorganosilsesquioxane resin having a hydroxyl group in the molecule and having a weight-average molecular weight of from 1000 to 50000.

4. The resin composition according to claim 1 wherein the polyorganosilsesquioxane resin (A) further comprises resin which is obtained by reacting two or more molecules of an organosilicon compound of the general formula (1), or a resin obtained by reacting two or more molecules of an organosilicon compound of the general formula (1) and at least one molecule of organosilicon compounds of the general formulae (2) to (5):

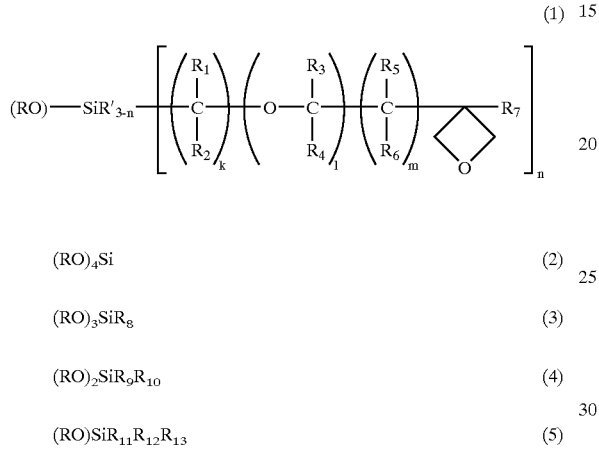

(RO)$_4$Si     (2)

(RO)$_3$SiR$_8$     (3)

(RO)$_2$SiR$_9$R$_{10}$     (4)

(RO)SiR$_{11}$R$_{12}$R$_{13}$     (5)

wherein, R represents a methyl group or ethyl group, R' represents a methoxy group, ethoxy group, or a mono-valent organic group having 1 to 20 carbon atoms, and when a plurality of R' are present they may be the same or different, $R_1$ to $R_7$ each independently represents a hydrogen atom or a mono-valent organic group having 1 to 20 carbon atoms, $R_8$ to $R_{13}$ each independently represents a mono-valent organic group having 1 to 20 carbon atoms, k, l, and m each represents independently an integer of 0 to 20, and n represents an integer of 1 to 3.

5. The resin composition according to claim 1 wherein the polyorganosilsesquioxane resin (A) is encapsulated at a terminal group by an organosilicon compound of the general formula (11):

wherein, X represents a halogen atom, and $R_{27}$ to $R_{29}$ each independently represents a mono-valent organic group having 1 to 20 carbon atoms.

6. The resin composition according to claim 3 wherein the hydroxyl group of the polyorganosilsesquioxane resin (C) is a phenolic hydroxyl group.

7. The resin composition according to claim 6 wherein the hydroxyl group of the polyorganosilsesquioxane resin (C) is a phenolic hydroxyl group of the general formula (16):

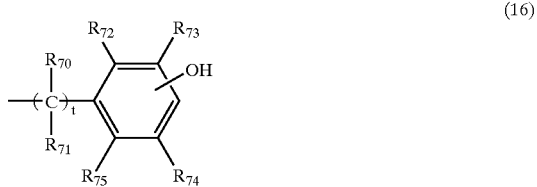

wherein $R_{70}$ and $R_{71}$ each independently represents a hydrogen atom or a mono-valent organic group having 1 to 20 carbon atoms, $R_{72}$ to $R_{75}$ each independently represents a hydrogen atom or a mono-valent organic group having 1 to 20 carbon atoms, and t represents an integer of 0 or more.

8. The resin composition according to claim 3 wherein the hydroxyl group of the polyorganosilsesquioxane resin (C) is an alcoholic hydroxyl group.

9. The resin composition according to claim 8 wherein the hydroxyl group of the polyorganosilsesquioxane resin (C) is an alcoholic hydroxyl group of the general formula (17):

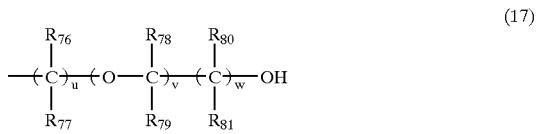

wherein, $R_{76}$ to $R_{81}$ each independently represents a hydrogen atom or a mono-valent organic group having 1 to 20 carbon atoms, u and v represent an integer of 0 or more, and w represents an integer of 1 or more.

10. Resin composition for intermediate layer of a three-layer resist, comprising (B) a compound generating an acid by electromagnetic wave or heat, (C) a polyorganosilsesquioxane resin having in the molecule a hydroxyl group and having a weight-average molecular weight of from 1000 to 50000, and at least one compound selected from the group consisting of compounds of the following formulae (18) and (19):

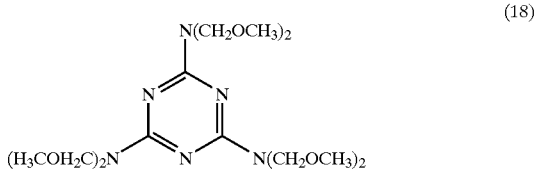

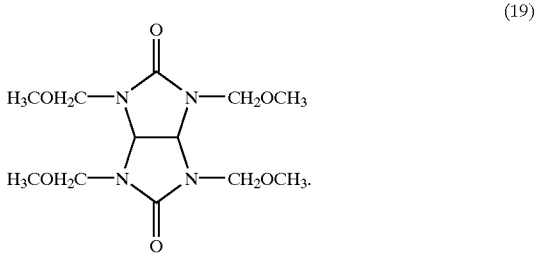

and wherein the polyorganosilsesquioxane resin (C) is obtained by reacting at least one molecule of polyorganosilsesquioxane resins obtained by hydrolyzing at least one of organosilicon compounds of the general formula (6) to (9) and two or more molecules of an organosilicon compound of the general formula (10):

(RO)$_4$Si     (6)

(RO)$_3$SiR$_{14}$     (7)

$(RO)_2SiR_{15}R_{16}$ (8)

$(RO)SiR_{17}R_{18}R_{19}$ (9)

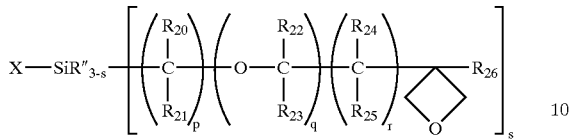
(10)

wherein, X represents a halogen atom, R represents a methyl group or ethyl group, R" and $R_{14}$ to $R_{26}$ each independently represents a mono-valent organic group having 1 to 20 carbon atoms, p, q, and r each independently represents an integer of 0 to 20, and s represents an integer of 1 to 3.

11. Resin composition for intermediate layer of a three-layer resist, comprising (C) a polyorganosilsesquioxane resin having a hydroxyl group in the molecule and having a weight-average molecular weight of 1000 to 50000, and wherein the polyorganosilsesquioxane resin (C) is obtained by reacting at least one molecule of polyorganosilsesquioxane resins obtained by hydrolyzing at least one of organosilicon compounds of the general formula (6) to (9) and two or more molecules of an organosilicon compound of the general formula (10):

$(RO)_4Si$ (6)

$(RO)_3SiR_{14}$ (7)

$(RO)_2SiR_{15}R_{16}$ (8)

$(RO)SiR_{17}R_{18}R_{19}$ (9)

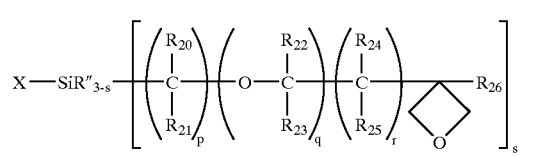
(10)

wherein, X represents a halogen atom, R represents a methyl group or ethyl group, R" and $R_{14}$ to $R_{26}$ each independently represents a mono-valent organic group having 1 to 20 carbon atoms, p, q, and r each independently represents an integer of 0 to 20, and s represents an integer of 1 to 3.

12. The resin composition according to claim 11, wherein the polyorganosilsesquioxane resin (C) is a polyorganosilsesquioxane resin having a phenolic hydroxyl group of the general formula (16):

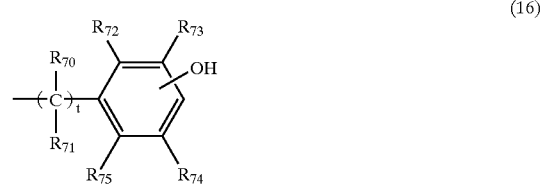
(16)

wherein $R_{70}$ and $R_{71}$ each independently represents a hydrogen atom or a mono-valent organic group having 1 to 20 carbon atoms, $R_{72}$ to $R_{75}$ each independently represents a hydrogen atom or a mono-valent organic group having 1 to 20 carbon atoms, and t represents an integer of 0 or more.

* * * * *